United States Patent
Xu et al.

(10) Patent No.: US 9,417,489 B2
(45) Date of Patent: Aug. 16, 2016

(54) LIQUID CRYSTAL DISPLAY DEVICE

(71) Applicant: BOE Technology Group Co., Ltd., Beijing (CN)

(72) Inventors: Zhiqiang Xu, Beijing (CN); Hyunsic Chol, Beijing (CN); Yoonsung Um, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 19 days.

(21) Appl. No.: 13/954,038

(22) Filed: Jul. 30, 2013

(65) Prior Publication Data

US 2014/0049740 A1 Feb. 20, 2014

(30) Foreign Application Priority Data

Aug. 14, 2012 (CN) .......................... 2012 1 0288959

(51) Int. Cl.
*G02F 1/1343* (2006.01)
*G02F 1/1362* (2006.01)

(52) U.S. Cl.
CPC ...... *G02F 1/134336* (2013.01); *G02F 1/13624* (2013.01); *G02F 1/134363* (2013.01)

(58) Field of Classification Search
CPC .......... G02F 1/134336; G02F 1/13624; G02F 1/134363
USPC ......................................................... 349/141
See application file for complete search history.

(56) References Cited

U.S. PATENT DOCUMENTS

| | | | |
|---|---|---|---|
| 8,520,156 B2 * | 8/2013 | Park et al. | 349/33 |
| 2002/0176030 A1 * | 11/2002 | Matsumoto | 349/43 |
| 2006/0227273 A1 * | 10/2006 | Shin et al. | 349/139 |
| 2009/0174854 A1 * | 7/2009 | Park | 349/141 |
| 2011/0273650 A1 * | 11/2011 | Chae | 349/108 |
| 2012/0099037 A1 | 4/2012 | Park et al. | |
| 2013/0162937 A1 | 6/2013 | Lu et al. | |

FOREIGN PATENT DOCUMENTS

| | | |
|---|---|---|
| CN | 102455558 A | 5/2012 |
| CN | 102629028 A | 8/2012 |
| EP | 2447771 A1 | 5/2012 |
| EP | 2610669 A1 | 3/2013 |
| WO | 2006085241 A | 8/2006 |

OTHER PUBLICATIONS

Communication of Extended European Search Report from European Patent Office rendered Oct. 17, 2013 for European Patent Application No. EP13180092; seven (7) pages.

First Office Action issued by State Intellectual Property Office of People's Republic of China issued Jun. 14, 2014, 6pgs.

(Continued)

Primary Examiner — James Dudek

(57) ABSTRACT

Embodiments of the present invention disclose a liquid crystal display device, comprising: a first substrate, including a base substrate, and gate lines and data lines, formed on the base substrate and crossing each other to define a plurality of pixel structures; a second substrate, cell-assembled with the first substrate to form a liquid crystal cell; and a liquid crystal layer, filled between the first substrate and the second substrate, wherein each of the plurality of pixel structures comprises: the base substrate; a common electrode, formed on the base substrate; a first insulating layer, formed on the common electrode; a plurality of strip-shaped pixel electrodes, formed on the first insulating layer, wherein the plurality of strip-shaped pixel electrodes include a plurality of positive electrodes and negative electrodes which are disposed alternately.

5 Claims, 2 Drawing Sheets

(56) References Cited

OTHER PUBLICATIONS

English translation of First Office Action issued by State Intellectual Property Office of People's Republic of China issued Jun. 14, 2014, 4pgs.

EPO Communication issued by the European Patent Office in EP patent application No. 13180092.2, dated Jul. 28, 2015; 5 pages.

English abstract of CN102629028A, dated Aug. 8, 2012.

* cited by examiner

LIQUID CRYSTAL DISPLAY DEVICE

CROSS REFERENCE TO RELATED APPLICATIONS

This application claims priority from Chinese National Application No. 201210288959.0, filed on Aug. 14, 2012, the contents of which are incorporated herein by reference.

TECHNICAL FIELD

Embodiments of the present invention relate to a liquid crystal display device.

BACKGROUND

Currently, with the development of liquid crystal display technology, a liquid crystal display device having characteristics of high transmittance, wide viewing angle, etc., becomes more and more necessary.

In the ADvanced Super Dimension Switch (AD-SDS, abbreviated as ADS) technology, a electric field generated by fringes of slit electrodes in the same plane and a electric field generated between the slit electrode layer and a plate electrode layer can constitute a multi-dimension electric field, so as to make liquid crystal molecules oriented in all directions between the slits electrodes and directly above the electrodes inside a liquid crystal cell capable of rotating, thus improving the operating efficiency of liquid crystals and increasing the light transmittance. The ADS technology can improve the displaying quality of a TFT-LCD, and has advantages of high resolution, high transmittance, low power consumption, wide viewing angle, high aperture ratio, low chromatic aberration, no push Mura, etc.

FIG. 1 is an electric field distribution diagram of an ADS-mode liquid crystal display device in the prior art, which is obtained by simulating using a liquid crystal simulation software 2D mos, as shown in FIG. 1, a common electrode 1 included in the ADS-mode liquid crystal display device is a plate electrode, and a plurality of strip-shaped pixel electrodes 2 spaced from each other disposed inside the ADS-mode liquid crystal display device, an insulating layer 3 is disposed between the common electrode 1 and the pixel electrodes 2; no voltage difference exists between any two pixel electrodes 2, and a voltage difference exists between the pixel electrodes 2 and the common electrode.

In the process of simulating the ADS-mode liquid crystal display device by using the liquid crystal simulation software 2D mos, the ADS-mode liquid crystal display device having the following parameters is taken as an example: the width W of each of the pixel electrodes 2 and the distance L between adjacent two pixel electrodes 2 satisfy the relationship: W/L=2/4.

The voltage difference between the pixel electrodes 2 and the common electrode 1 is 5.1V. Since no voltage difference exists between any two pixel electrodes 2, an electric field for deflecting liquid crystals of the ADS-mode liquid crystal display device is generated through the voltage difference between the pixel electrodes 2 and the common electrode 1, wherein a horizontal direction component of an electric field 5 entering inside a liquid crystal layer 4 has a smaller proportion, so that the rotation angle in the horizontal direction of liquid crystal molecules inside the liquid crystal layer 4 is smaller, which affects the light transmittance of the liquid crystal layer 4, and according to the 2D mos simulation, it can be known that the light transmittance of the ADS-mode liquid crystal display device in the prior art is 41%.

Accordingly, a liquid crystal display device capable of enhancing the light transmittance of the liquid crystal layer meanwhile the wide viewing angle characteristic is guaranteed needs to be provided.

SUMMARY

An embodiment of the present invention provides a liquid crystal display device capable of enhancing the light transmittance of the liquid crystal layer meanwhile the wide viewing angle characteristic is guaranteed.

An embodiment of the present invention provides a liquid crystal display device, comprising: a first substrate, including a base substrate, and gate lines and data lines, formed on the base substrate and crossing each other to define a plurality of pixel structures; a second substrate, cell-assembled with the first substrate to form a liquid crystal cell; and a liquid crystal layer, filled between the first substrate and the second substrate, wherein each of the plurality of pixel structures comprises: the base substrate; a common electrode, formed on the base substrate; a first insulating layer, formed on the common electrode; a plurality of strip-shaped pixel electrodes, formed on the first insulating layer, wherein the plurality of strip-shaped pixel electrodes include a plurality of positive electrodes and negative electrodes which are disposed alternately.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
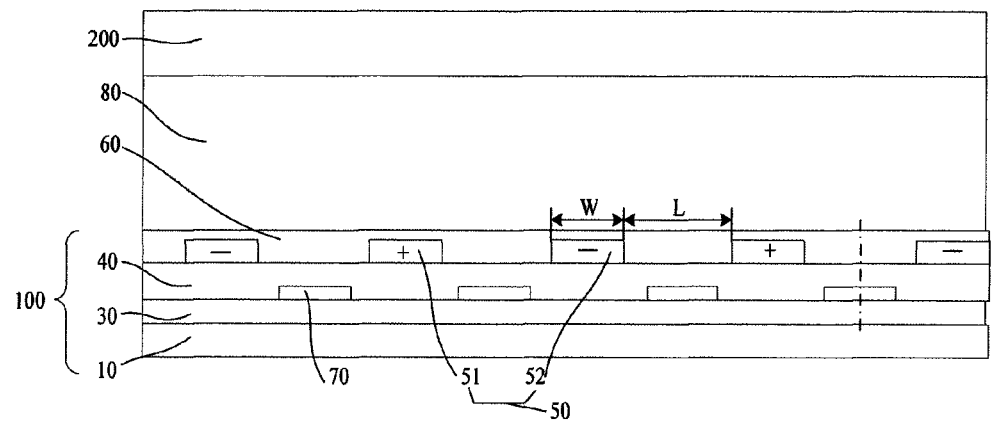
FIG. 2 is a cross-sectional structure view of a liquid crystal display device according to an embodiment of the present invention.
Figure 3:
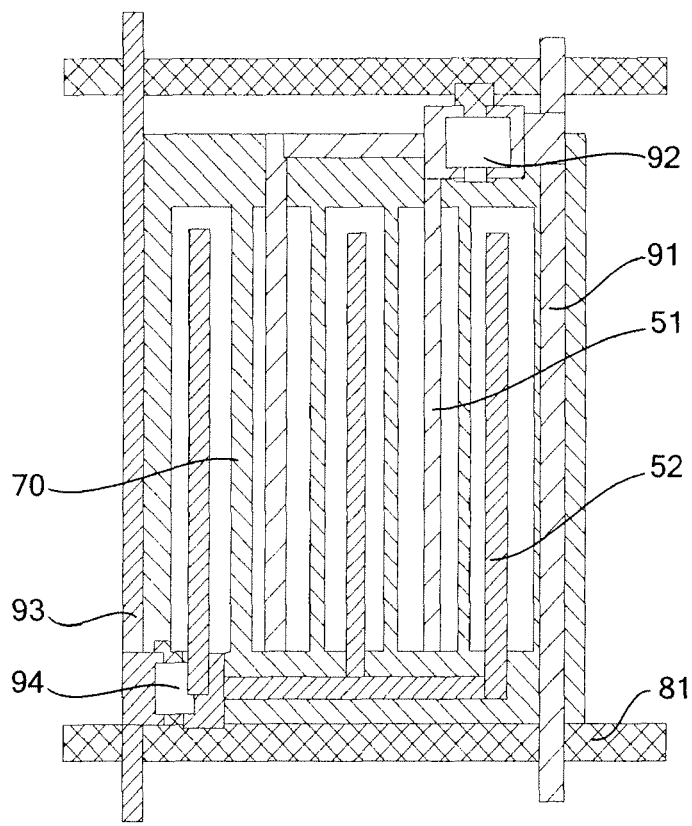
FIG. 3 is a plan view of one pixel structure in a liquid crystal display device according to an embodiment of the present invention.

An embodiment of the present invention provides a liquid crystal display device, FIG. 2 shows a cross-sectional structure view of the liquid crystal display device according to an embodiment of the present invention, and FIG. 3 shows a plan view of one pixel structure in the liquid crystal display device according to an embodiment of the present invention.

As shown in FIG. 2 and FIG. 3, the liquid crystal display device provided by an embodiment of the present invention comprises: a first substrate 100, including a base substrate 10, gate lines 81 and data lines 91 and 93 formed on the base substrate 100 and crossing each other to define a plurality of pixel structures; a second substrate 200, cell-assembled with the first substrate 100 to form a liquid crystal cell; and a liquid crystal layer 80, located between the first substrate 100 and the second substrate 200, wherein each of the pixel structures comprises: a common electrode 70 formed on the base substrate 10, a first insulating layer 40 formed on the common electrode 70, and a plurality of pixel electrodes 50 having a strip-shaped structure formed on the first insulating layer 40, wherein the plurality of pixel electrodes 50 include a plurality of positive electrodes 51 and negative electrodes 52 disposed alternately.

In the liquid crystal display device provided by an embodiment of the present invention, the first substrate 100 includes the base substrate 10 formed of a glass substrate 10, inside of the glass substrate 10, i.e., on a surface opposed to the second substrate 200, there is covered a second insulating layer 30, the common electrode 70 is located between the first insulating layer 40 and the second insulating layer 30, the first insulating layer 40 is located between the common electrode 70 and the pixel electrodes 50, and an alignment layer 60 is covered on the pixel electrodes 50.

Since in each pixel structure, the pixel electrodes 50 of the first substrate 100 includes a plurality of the positive electrodes 51 and the negative electrodes 52 which are disposed alternately, after the pixel structure is energized, except that an electric field is generated between the pixel electrodes 50 and the common electrode 70, an electric field is also generated between the positive electrodes 51 and the negative electrodes 52 which are disposed alternately in the pixel electrodes 50, and in the electric field generated between the positive electrodes 51 and the negative electrodes 52, a horizontal direction component of the electric field has a larger proportion, increasing the proportion of the horizontal direction component of the electric field inside the liquid crystal layer 80, therefore, and thus, as compared with a ADS-mode liquid crystal display device in the prior art, when the positive electrodes 51 and the negative electrodes 52 and the common electrode 70 are energized, the rotation angle in the horizontal direction of liquid crystal molecules within the liquid crystal layer 80 of the liquid crystal display device according to an embodiment of the present invention is relatively larger, thereby increasing the light transmittance of the liquid crystal layer 80.

Accordingly, in the liquid crystal display device provided by an embodiment of the present invention, since the pixel electrodes 50 include the positive electrodes 51 and the negative electrodes 52 disposed alternately, the light transmittance of the liquid crystal layer is enhanced.

Furthermore, on the basis of the above technical solution, in order to increase the uniformity of the electric field generated between each of the positive electrodes 51 and each of the negative electrodes 52, alternatively, in a direction perpendicular to an extending direction of the pixel electrodes 50, the positive electrodes 51 and the negative electrodes 52 are disposed alternately with a uniform interval on the first insulating layer 40, and a voltage difference between the positive electrodes 51 and the common electrode 70 is equal to a voltage difference between the common electrode 70 and the negative electrodes 52.

Alternatively, the common electrode 70 in the liquid crystal display device according to an embodiment of the present invention may in a plate-shaped structure.

Alternatively, in order to avoid generating a parasitic capacitance between the common electrode 70 and the positive electrodes 51 and negative electrodes 52 of the pixel electrodes 50, as shown in FIG. 2 and FIG. 3, the common electrode 70 inside each pixel structure is formed as a plurality of strip-shaped common electrodes, and a extending direction of the strip-shaped common electrodes is parallel to the extending direction of the pixel electrodes 50, each of the strip-shaped common electrodes being directly opposed to a slit between two adjacent pixel electrodes of the pixel electrodes 50. Thus, there is no phenomenon that the common electrode 70 and the pixel electrodes 50 are overlapped with each other, thereby avoiding a generation of the parasitic capacitance between the common electrode 70 and the pixel electrodes 50 to improve the display effect of the liquid crystal display device.

On the basis of the above technical solution, as shown in FIG. 2, in order to further enhance the uniformity of a generated electric field when the pixel structure is energized, alternatively, in a direction perpendicular to of the extending direction of the strip-shaped common electrodes, a plurality of the strip-shaped common electrodes are uniformly distributed, and a center line of each of the strip-shaped common electrodes coincides with a center line of a slit between any two adjacent pixel electrodes of the pixel electrodes 50.

As shown in FIG. 3, in the liquid crystal display device according to the embodiment of the present invention, each pixel structure is defined by the crossing of the first and second data lines 91 and 93 and the gate lines 81, thus, each pixel structure is driven by two data lines 91 and 93, namely, each pixel structure is driven by using double data lines, two data lines 91 and 93 provide a positive voltage and a negative voltage for the positive electrodes 51 and the negative electrodes 52, respectively; exemplarily, the positive electrodes 51 are electrically connected to the first data line 91 through a first transistor 92, and the negative electrodes 52 are electrically connected to the second data line 93 through a second transistor 94.

Figure 1:
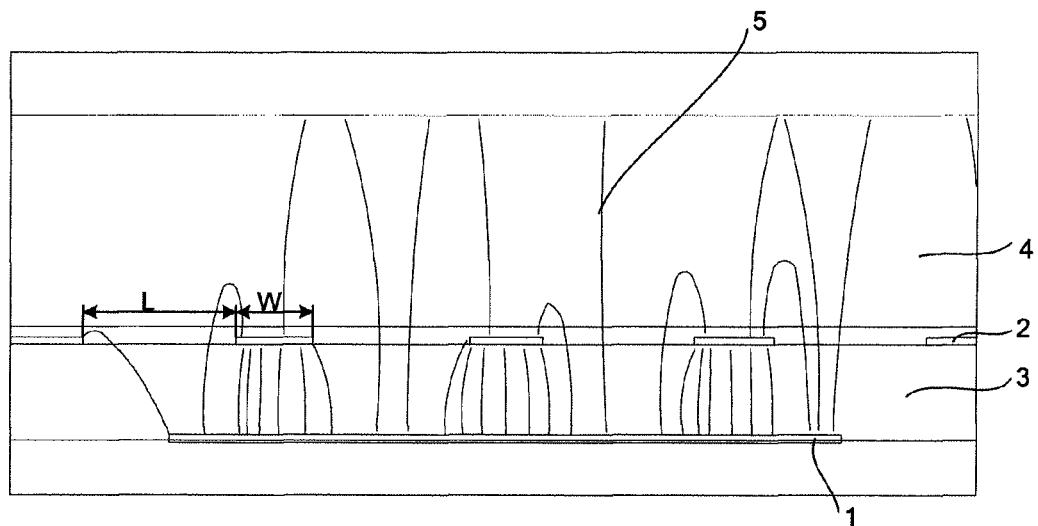
FIG. 1 is an electric field distribution diagram of an ADS-mode liquid crystal display device in the prior art, which is obtained by simulating using a liquid crystal simulation software 2D mos.
Figure 4:
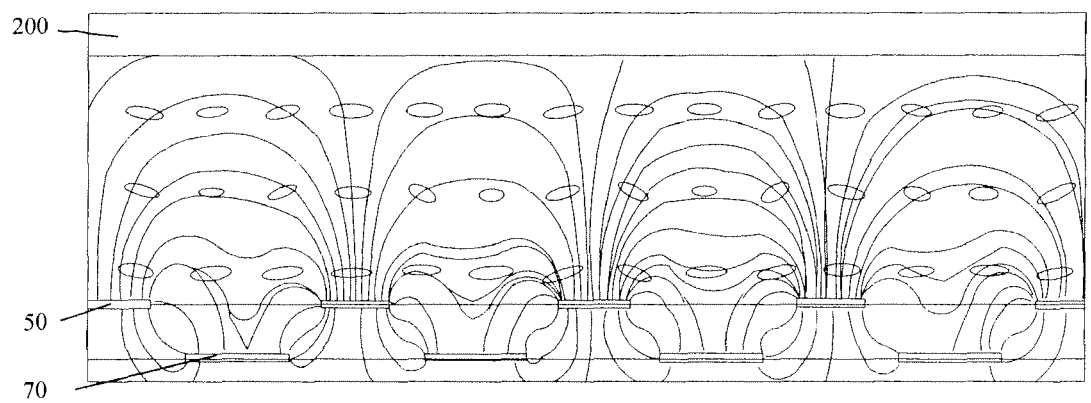
FIG. 4 is an electrical field distribution diagram of a liquid crystal display device according to an embodiment of the present invention obtained by simulating using the liquid crystal simulation software 2D mos.

FIG. 4 shows an electrical field distribution diagram of the liquid crystal display device according to an embodiment of the present invention obtained by simulating using the liquid crystal simulation software 2D mos, according to FIG. 4, it can be obviously seen that compared with the current liquid crystal display device as shown in FIG. 1, in the liquid crystal display device according to the embodiment of the present invention, because the positive and negative pixel electrodes are alternately disposed each other, inside of the liquid crystal layer, especially at a position where the liquid crystal layer is close to the second substrate 200, the horizontal direction component of the electric field is relatively large, therefore, liquid crystal molecules here relative to the prior art will generate a larger liquid crystal molecule deflection angle, thereby improving the light transmittance of the liquid crystal display device on the whole. Specifically, in the simulation using the liquid crystal simulation software 2D mos, the specific parameters of the liquid crystal display device according to the embodiment of the present invention are: the width W of each of the pixel electrodes 50 and the distance L between adjacent two of the pixel electrodes 50 satisfy the relationship: $W/L=2/5$, the width W of the common electrode 70 and the distance L between the common electrode 70 and the adjacent common electrode 70 satisfy the relationship: $W/L=2/5$, and a voltage difference between the positive electrodes 51 and the strip-shaped common electrodes is 3V, a voltage difference between the strip-shaped common electrodes and the negative electrodes 52 is 3V, at this time, the light transmittance of the liquid crystal display device obtained by the liquid crystal simulation software 2D mos is 44%, which is apparently higher than the light transmittance of the liquid crystal display device displayed in the ADS-mode liquid crystal display device in the prior art.

To sum up, in the liquid crystal display device provided by an embodiment of the present invention, in each pixel structure, the pixel electrodes 50 include the positive electrodes 51 and the negative electrodes 52 which are disposed alternately, the common electrode 70 disposed within each pixel structure also is formed as a plurality of strip-shaped common electrodes, and an extending direction of the strip-shaped common electrodes is parallel to the extending direction of the pixel electrodes 50, each of the strip-shaped common electrodes being directly opposed to a slit between two adjacent pixel electrodes of the pixel electrodes 50. Thus, after the pixel structure is energized, except that an electric field is generated between the pixel electrodes 50 and the common electrode 70, an electric field is also generated between the positive electrodes 51 and the negative electrodes 52 which are disposed alternately in the pixel electrodes 50, and in the electric field generated between the positive electrodes 51 and the negative electrodes 52, a horizontal direction component of the electric field has a larger proportion, increasing the proportion of the horizontal direction component of the electric field inside the liquid crystal layer 80, therefore, and thus, as compared with a ADS-mode liquid crystal display device in the prior art, the rotation angle in the horizontal direction of liquid crystal molecules within the liquid crystal layer 80 of the liquid crystal display device according to an embodiment of the present invention is relatively larger, thereby increasing the light transmittance of the liquid crystal layer 80, and there is no phenomenon that the common electrode 70 and the pixel electrodes 50 are overlapped with each other, thereby avoiding a generation of the parasitic capacitance between the common electrode 70 and the pixel electrodes 50 to improve the display effect of the liquid crystal display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A liquid crystal display device comprising a plurality of pixel structures, at least one of the pixel structures comprising:

a common electrode, a pixel electrode formed on a base substrate, wherein the pixel electrodes and the common electrode are formed in different layers with a first insulating layer inserted therebetween;

wherein the pixel electrode is formed to comprise a plurality of first strip-shaped pixel electrodes for receiving a first signal and a plurality of second strip-shaped pixel electrodes for receiving a second signal, the plurality of first strip-shaped pixel electrodes and the plurality of second strip-shaped pixel electrodes are disposed alternately, wherein the common electrode is formed to comprise a plurality of strip-shaped common electrodes, and each of the strip-shaped common electrodes is directly opposed to a slit between two corresponding adjacent first and second strip-shaped pixel electrodes, wherein a width W of each of the pixel electrodes and a distance L between the two corresponding adjacent the pixel electrodes satisfy W/L=2/5.

2. The liquid crystal display device according to claim 1, wherein an extending direction of the strip-shaped common electrodes is parallel to an extending direction of the first and second strip-shaped pixel electrodes.

3. The liquid crystal display device according to claim 1, wherein the first and second strip-shaped pixel electrodes are uniformly disposed in a direction perpendicular to an extending direction of the first and second strip-shaped pixel electrodes.

4. The liquid crystal display device according to claim 1, wherein the plurality of the strip-shaped common electrodes are uniformly distributed in a direction perpendicular to an extending direction of the strip-shaped common electrodes, and a center line of each of the strip-shaped common electrodes coincides with a center line of the slit between the two corresponding adjacent first and second strip-shaped pixel electrodes.

5. The liquid crystal display device according to claim 1, wherein the at least one of the pixel structures is defined by a first and second data lines and a gate lines crossing each other, each of the first strip-shaped pixel electrode is electrically connected to the first data line through a first transistor, and each of the second strip-shaped pixel electrode is electrically connected to the second data line through a second transistor.

* * * * *